(12) United States Patent
Brahmadesam et al.

(10) Patent No.: US 10,929,428 B1
(45) Date of Patent: Feb. 23, 2021

(54) ADAPTIVE DATABASE REPLICATION FOR DATABASE COPIES

(71) Applicant: Amazon Technologies, Inc., Seattle, WA (US)

(72) Inventors: Murali Brahmadesam, Woodinville, WA (US); Seungmin Wei, Bellevue, WA (US); Sumit Kumar, Bellevue, WA (US); Raman Mittal, Seattle, WA (US); Crosbie Matthew Smith, Seattle, WA (US); Kevin Liu, Seattle, WA (US); Aadithya Chandramalle Gowda, Seattle, WA (US); Ramesh Shankar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 15/918,989

(22) Filed: Mar. 12, 2018

Related U.S. Application Data

(60) Provisional application No. 62/590,217, filed on Nov. 22, 2017.

(51) Int. Cl.
*G06F 16/27* (2019.01)
*G06F 16/23* (2019.01)

(52) U.S. Cl.
CPC ......... *G06F 16/27* (2019.01); *G06F 16/2358* (2019.01); *G06F 16/2379* (2019.01)

(58) Field of Classification Search
CPC ... G06F 16/27; G06F 16/2358; G06F 16/2379
USPC ........................................ 707/610, 613, 625
See application file for complete search history.

(56) References Cited

U.S. PATENT DOCUMENTS

| | | | | |
|---|---|---|---|---|
| 6,408,294 | B1* | 6/2002 | Getchius | G06F 16/24534 707/999.004 |
| 6,493,721 | B1* | 12/2002 | Getchius | G06Q 30/02 707/999.107 |
| 8,150,812 | B2* | 4/2012 | Todd | G06F 16/273 707/662 |
| 10,567,500 | B1* | 2/2020 | Leshinsky | H04L 67/1097 |
| 2005/0289198 | A1* | 12/2005 | Todd | G06F 11/2097 707/999.204 |
| 2011/0034179 | A1* | 2/2011 | David | G01S 5/0236 455/456.1 |
| 2018/0137186 | A1* | 5/2018 | Brodt | G06F 16/214 |
| 2020/0186602 | A1* | 6/2020 | Leshinsky | G06F 11/1464 |

OTHER PUBLICATIONS

MySQL 5.7 Reference Manual, "Chapter 16 Replication", Retrieved from URL: https://dev.mysql.com/doc/refman/5.7/en/replication.html, pp. 1-3.

\* cited by examiner

*Primary Examiner* — Phong H Nguyen
(74) *Attorney, Agent, or Firm* — Robert C. Kowert; Kowert, Hood, Munyon, Rankin & Goetzel, P.C.

(57) ABSTRACT

Adaptive replication of changes may be performed for copies of a database. Log records may be generated and stored that correspond to changes to a database while a database is being copied. If the changes to be applied to a copy of the database is less than or equal to a threshold number of changes, then the copy of the database may be updated using the stored log records. If the changes to be applied to the copy of the database are greater than the threshold number of changes, then the copy of the database may be updated using data stored in the database.

20 Claims, 12 Drawing Sheets

ADAPTIVE DATABASE REPLICATION FOR DATABASE COPIES

RELATED APPLICATIONS

This application claims benefit of priority to U.S. Provisional Application Ser. No. 62/590,217, entitled "GEOGRAPHICAL MIRRORS FOR DATABASES," filed Nov. 22, 2017, and which is incorporated herein by reference in its entirety.

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

A copy of a database, such as a read replica, may be updated in order to scale out access to a database (e.g., read processing). For example, as changes are made to the structure of the database, a SQL record may be created in a logical replication log which may then be propagated to all the replicas. A database engine for a copy of the database would then run these SQL statements locally on the copy of the database. Replicating changes in this way, however, can increase the amount of time for replicating changes, allowing database copies to fall further behind the source database. Therefore, techniques that improve the performance of replicating database changes are highly desirable.

Figure 1:
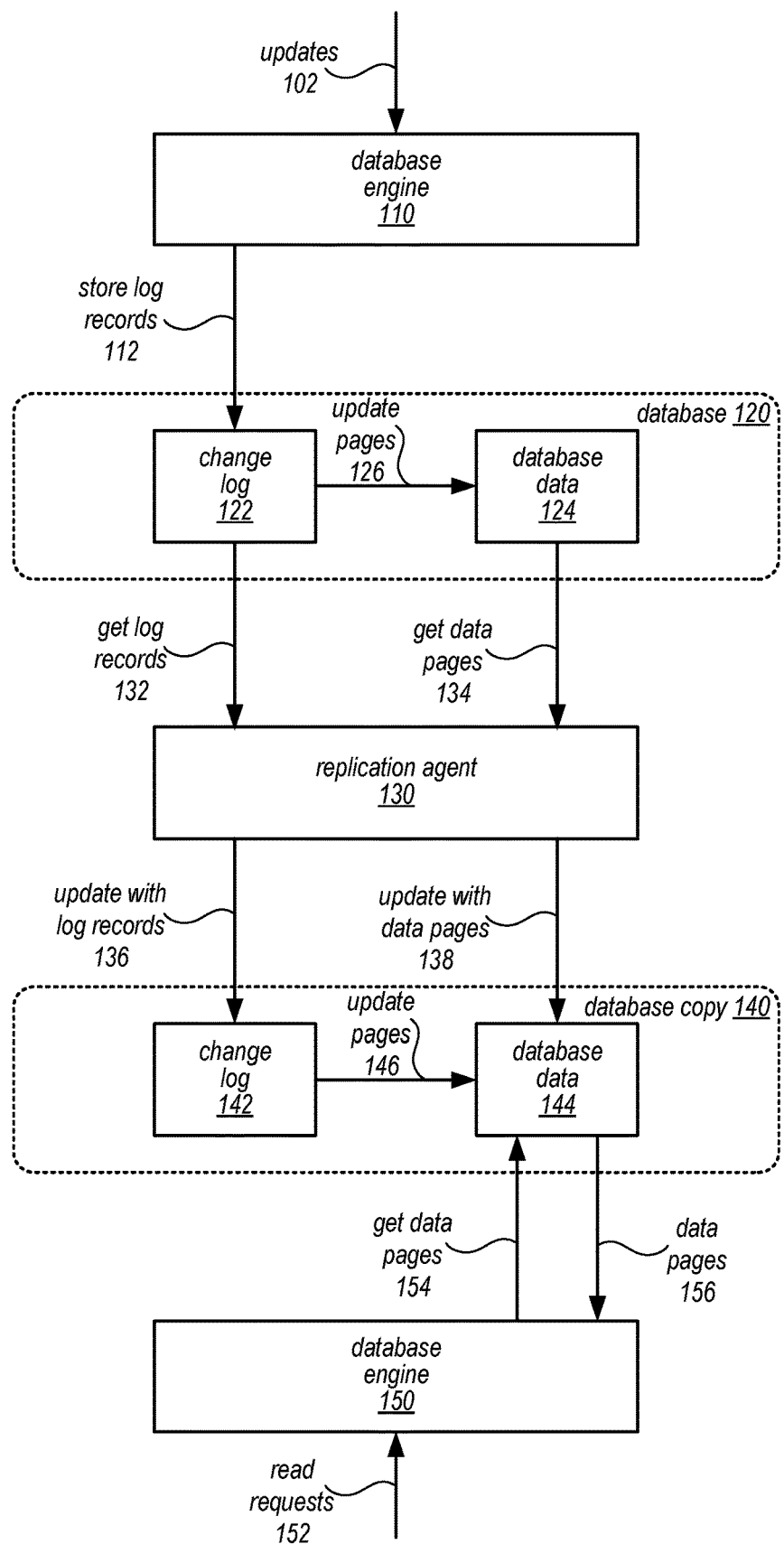
FIG. 1 is a logical block diagram illustrating adaptive replication for database copies, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of adaptive replication for database copies are described herein. In some embodiments, adaptive replication for database copies can significantly improve the speed at which database replication is performed (e.g., in scenarios where database copies are maintained over significant geographical distances that may be too great to otherwise keep the replicas synchronized through other techniques). Adaptive replication for database copies may reduce replication lag, the delay between operations occurring on a source or primary database and a copy of the database (e.g., which may serve as a standby copy or a copy available for access), by an order of magnitude. In this way, database copies can be maintained in close synchronization without high performance costs and delays, which may be valuable in various scenarios like disaster recovery operations where recovery time and replication lag play a critical role in determining database continuity as the amount of data lost due to replication lag may be minimized.

FIG. 1 is a logical block diagram illustrating adaptive replication for database copies, according to some embodiments. Database 120 may be replicated to one or multiple locations in order to increase the availability and durability of the data stored within, in some embodiments. In order to ensure that copies of database 120, such as database copy 140, are up to date, adaptive replication techniques may be implemented in order to perform replication techniques that adapt to different replication scenarios while minimizing the time in which database copies are unavailable to service access requests, in some embodiments.

For example, as illustrated in FIG. 1, a database engine (e.g., a database management system or query engine) that includes access request planning and execution, may receive access requests to write to database 120, such as updates 102, in some embodiments. Database engine 110 may record and store these updates as log records 112 in a change log 122 for database 120. The change log may be used to update pages 126 of the underlying database data 124 for database 120, in some embodiments. As discussed below with regard to FIGS. 2-7, in some embodiments updates to underlying database data may be performed lazily, in the background or in response to a request to read data, while in other embodiments the updates may be performed when updates to the log are performed.

A replication agent 130 may be implemented, in some embodiments, to selectively obtain the updates to replicate to database copy 140. In some embodiments, as discussed below with regard to FIGS. 8 and 9, a threshold number of changes may be evaluated with respect to a number of updates to replicate. If the number of changes is less than or equal to the threshold, then log records may be used to update database copy 140, in some embodiments. For example, replication agent 130 may get log records 132 from change log 122 and update the database copy 140 with log records 136 (using similar techniques to update pages 146 in the underlying database data 144), in some embodiments. In scenarios where the number of changes exceeds the threshold, then updates may be performed by obtaining data from the database (e.g., getting data pages 134) updating the database data 144 with the obtained data pages 138. FIGS. 7-11 discuss the various techniques for implementing the different types of updates which may be performed, in some embodiments. While the updates are being copied, database engine 150 may still be able to provide access to database copy 140, by performing read requests 152 to get data pages 154 and 156 in order to service the read requests, in some embodiments.

Please note, FIG. 1 is provided as a logical illustration of database engines, replication agents, databases, database copies, and respective interactions and is not intended to be limiting as to the physical arrangement, size, or number of components, modules, or devices to implement such features. For example, in some embodiments, database engines may directly perform the described techniques without a replication agent or multiple replication agents may be used, as discussed below with regard to FIGS. 6 and 7.

The specification first describes an example network-based database service that performs adaptive replication for database copies. Included in the description of the example network-based database service are various aspects of the example network-based database service, such as a database engine head node, and a separate storage service. The specification then describes flowcharts of various embodiments of methods for adaptive replication for database copies. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the systems described herein may partition functionality of a database system, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node server, that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof)

may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the client-side driver(s) running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may determine the one or more nodes that are implementing the storage for the targeted data page (e.g., based on storage metadata for the distributed storage system), and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

Figure 2:
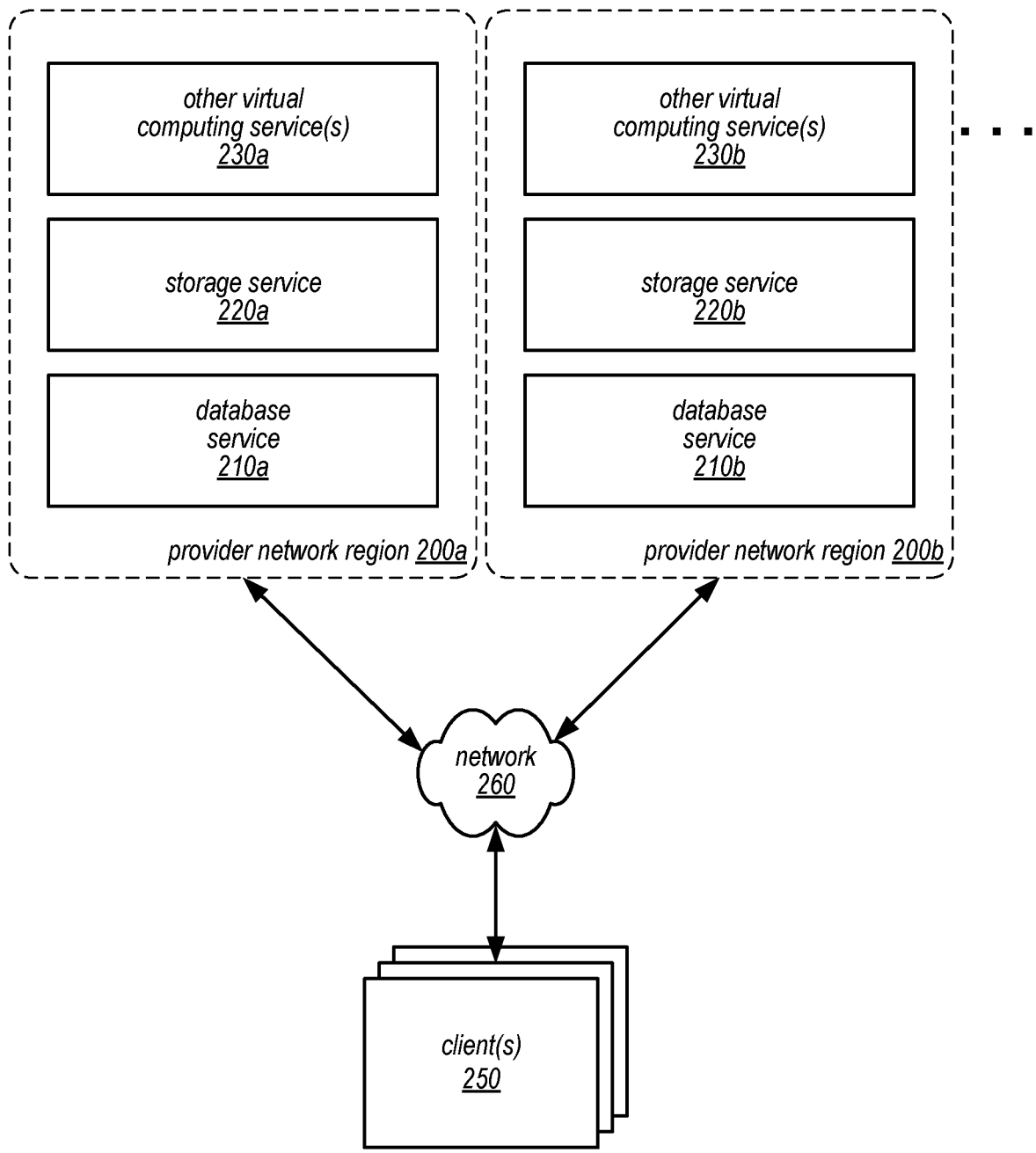
FIG. 2 is a block diagram illustrating provider network regions that may implement database services that implement adaptive replication for database copies, according to some embodiments.

One embodiment of a service system architecture that may implement a web services-based database service is illustrated in FIG. 2 is a block diagram illustrating provider network regions that may implement database services that implement adaptive replication for database copies, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network within the provider network regions 200. Provider network regions 200 may, in some embodiments, be isolated from other provider network regions. In the illustrated embodiment, a number of clients (shown as clients 250 may interact with a provider network region 200 via a network 260. Provider network regions 200 may implement respective instantiations of the same (or different) services, a database services 210a and 210b, a storage services 220a and 220b and/or one or more other virtual computing services 230a and 230b. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network region 200 may be coordinated by client 250 and the operating system or file system on behalf of applications executing within the operating system environment.

Clients 250 may convey network-based services requests to and receive responses from provider network region 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network region 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, provider network region 200 may implement one or more service endpoints may receive and process network-based services requests, such as requests to access data pages (or records thereof). For example, provider network region 200 may include hardware and/or software may implement a particular endpoint, such that an HTTP-based network-based services request directed to that endpoint is properly received and processed. In one embodiment, provider network region 200 may be implemented as a server system may receive network-based services requests from clients 250 and to forward them to components of a system that implements database service 210, storage service 220 and/or another virtual computing service 230 for processing. In other embodiments, provider network region 200 may be configured as a number of distinct systems (e.g., in a cluster topology) implementing load balancing and other request management features may dynamically manage large-scale network-based services request processing loads. In various embodiments, provider network region 200 may be may support REST-style or document-based (e.g., SOAP-based) types of network-based services requests.

In addition to functioning as an addressable endpoint for clients' network-based services requests, in some embodiments, provider network region 200 may implement various client management features. For example, provider network region 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network region 200 may also implement financial accounting and billing systems, or may maintain a database of usage data that may be queried and processed by external systems for reporting and billing of client usage activity. In certain embodiments, provider network region 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network region 200 may also implement user authentication and access control procedures. For example, for a given network-based services request to access a particular database table, provider network region 200 ascertain whether the client 250 associated with the request is authorized to access the particular database table. Provider network region 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
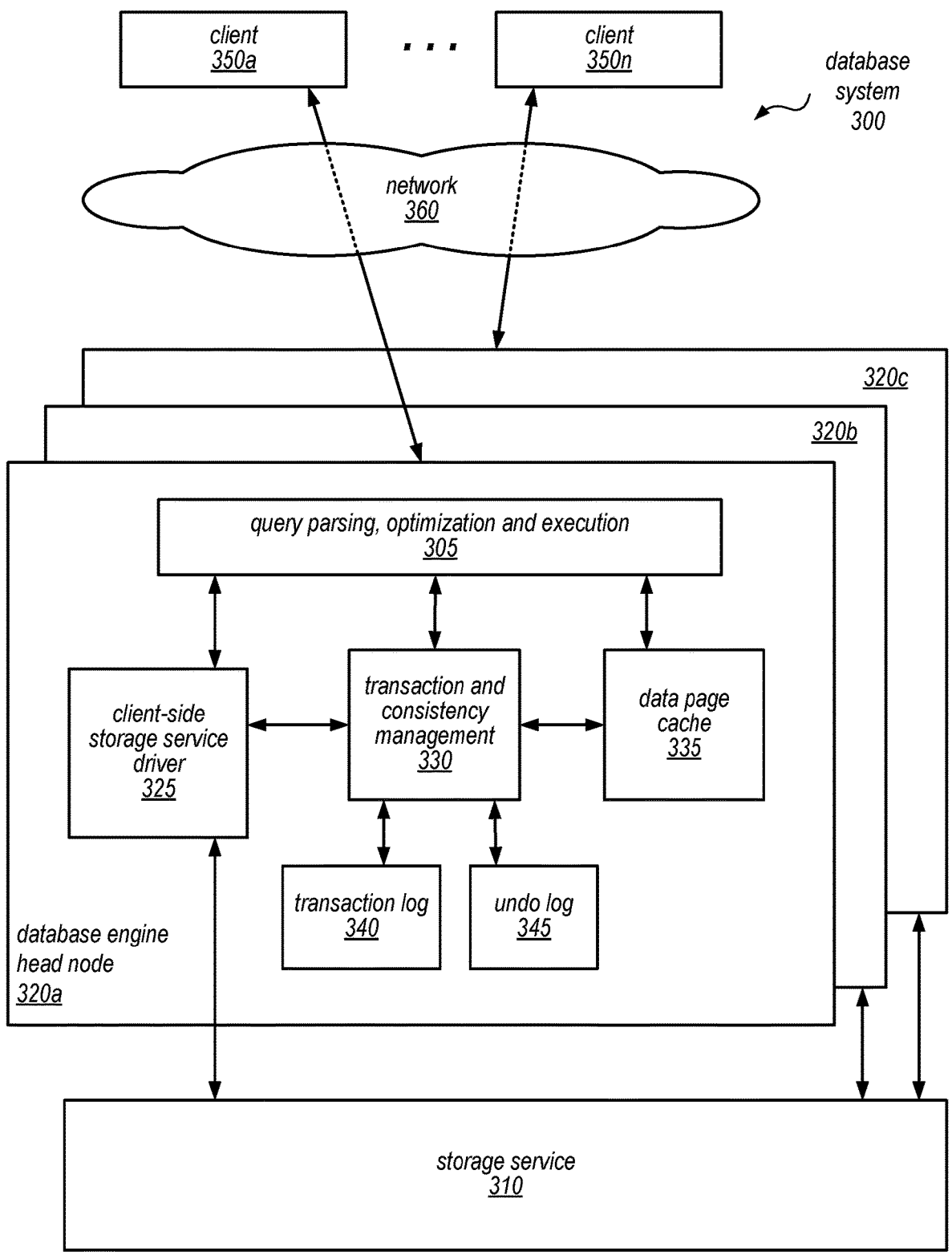
FIG. 3 is a block diagram illustrating various components of a database system that may implement adaptive replication for database copies, such as copies of database hosted in another provider network region, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a storage service 310 (which may or may not be visible to the clients of the database system, shown as clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, storage service 310 may perform various storage, access, change logging, recovery, log record manipulation, and/or space management operations in a manner that is invisible to clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops a plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance, such as applying undo log records to generate prior versions of tuples of a database from dirty tuples received from storage nodes, as discussed below. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component. Although not illustrated, in some embodiments, read replicas or other database engine nodes may be implemented, as discussed below with regard to FIG. 6 that may also provide access to a same database as database engine head nodes 320 (e.g., read-only head nodes or secondary head nodes).

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

In some embodiments, a storage device may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An storage device is not necessarily mapped directly to hardware. For example, a single storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
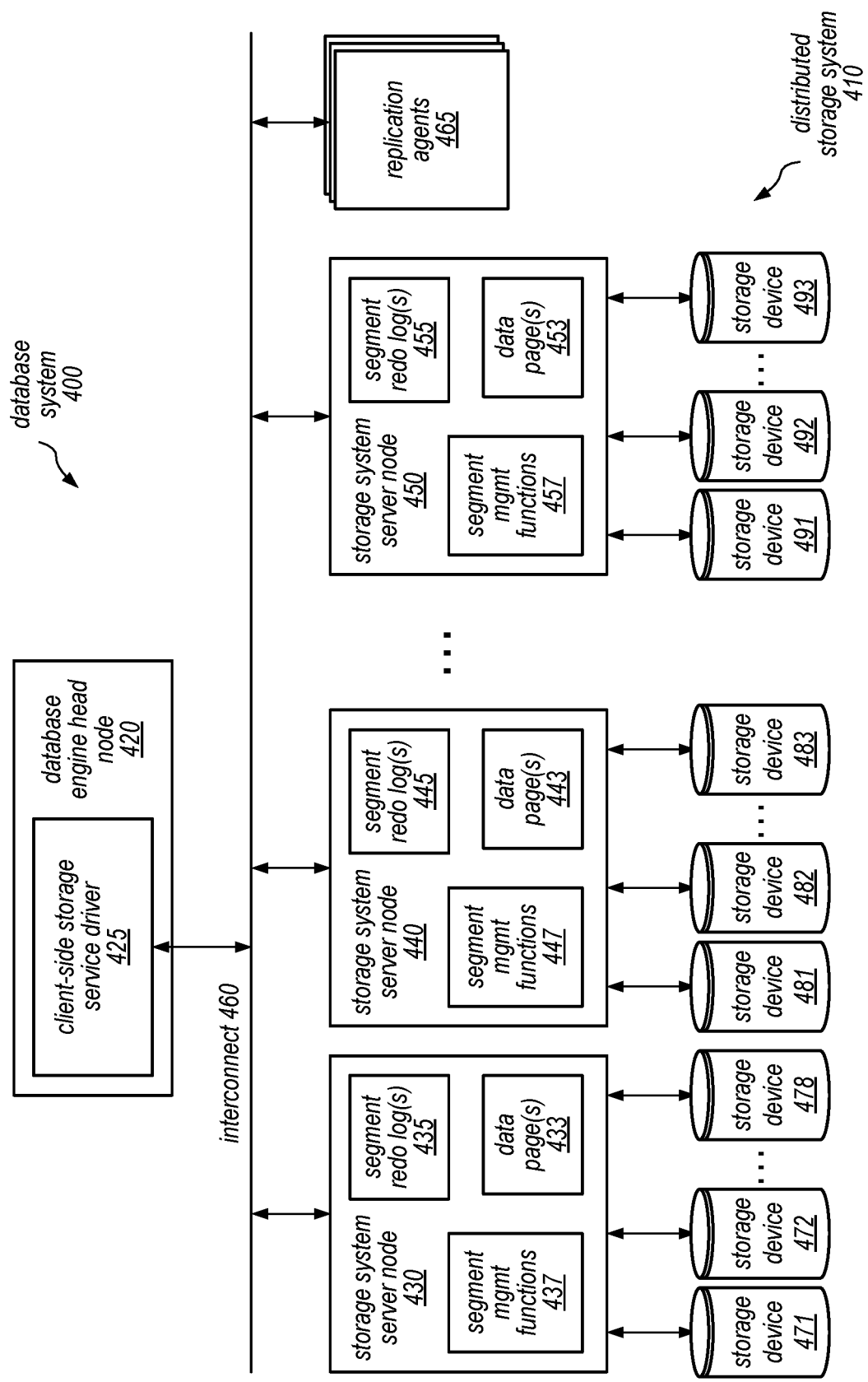
FIG. 4 is a block diagram illustrating a distributed storage system, according to some embodiments.

One embodiment of a distributed storage system that may implement a storage service is illustrated by the block diagram in FIG. 4. In this example, a database system 400 includes a distributed storage system 410, which communicates with a database engine head node 420 over interconnect 460. As in the example illustrated in FIG. 3, database engine head node 420 may include a client-side storage service driver 425. In this example, distributed storage system 410 includes multiple storage nodes (including those shown as 430, 440, and 450), each of which includes storage for data pages, redo logs for the segment(s) it stores, system metadata for database engine head 420 (e.g., data dictionary data, transaction table data etc.) and hardware and/or software may perform various segment management functions. For example, each storage node may include hardware and/or software may perform at least a portion of any or all of the following operations: replication (locally, e.g., within the storage node), coalescing of redo logs to generate data pages, crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments.

In the example illustrated in FIG. 4, storage node 430 includes data page(s) 433, segment redo log(s) 435, segment management functions 437, and attached storage devices 471-478. Similarly, storage node 440 includes data page(s) 443, segment redo log(s) 445, segment management functions 447, and attached storage devices 481-488; and storage node 450 includes data page(s) 453, segment redo log(s) 455, segment management functions 457, and attached storage devices 491-498.

Replication agents 465, discussed in detail below with regard to FIGS. 6 and 7, may be implemented as part of distributed storage system 410 or other storage service, as discussed above. In some embodiments, distributed storage system 410 may be multi-tenant storing data for different databases hosted on behalf of different user accounts (e.g., owned, operated, managed by different entities) by sharing resources at storage nodes, in some embodiments. Some replication agent(s) 465 may perform the below replication techniques for multiple different databases for different user accounts, in some embodiments.

Figure 5:
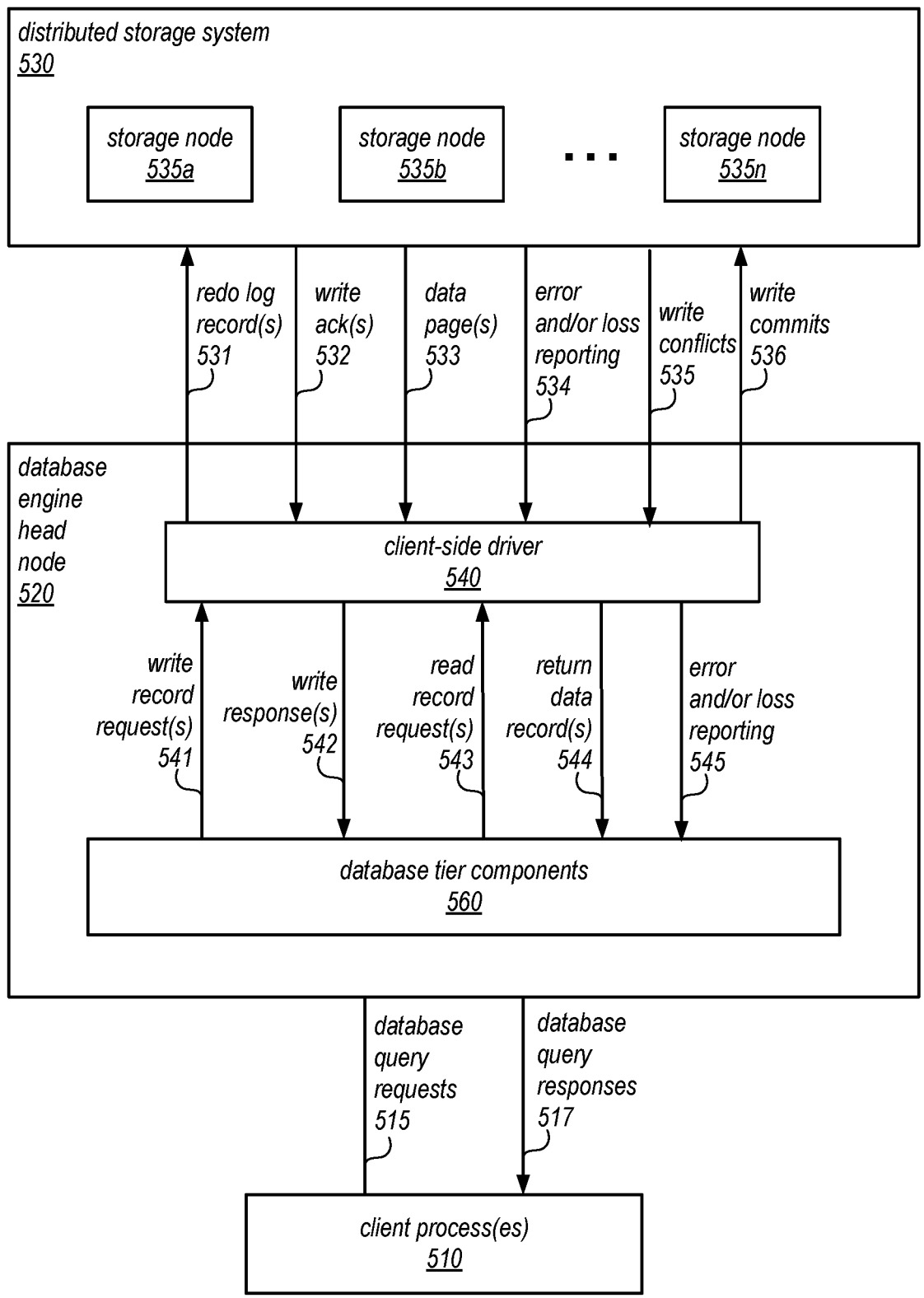
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

Figure 6:
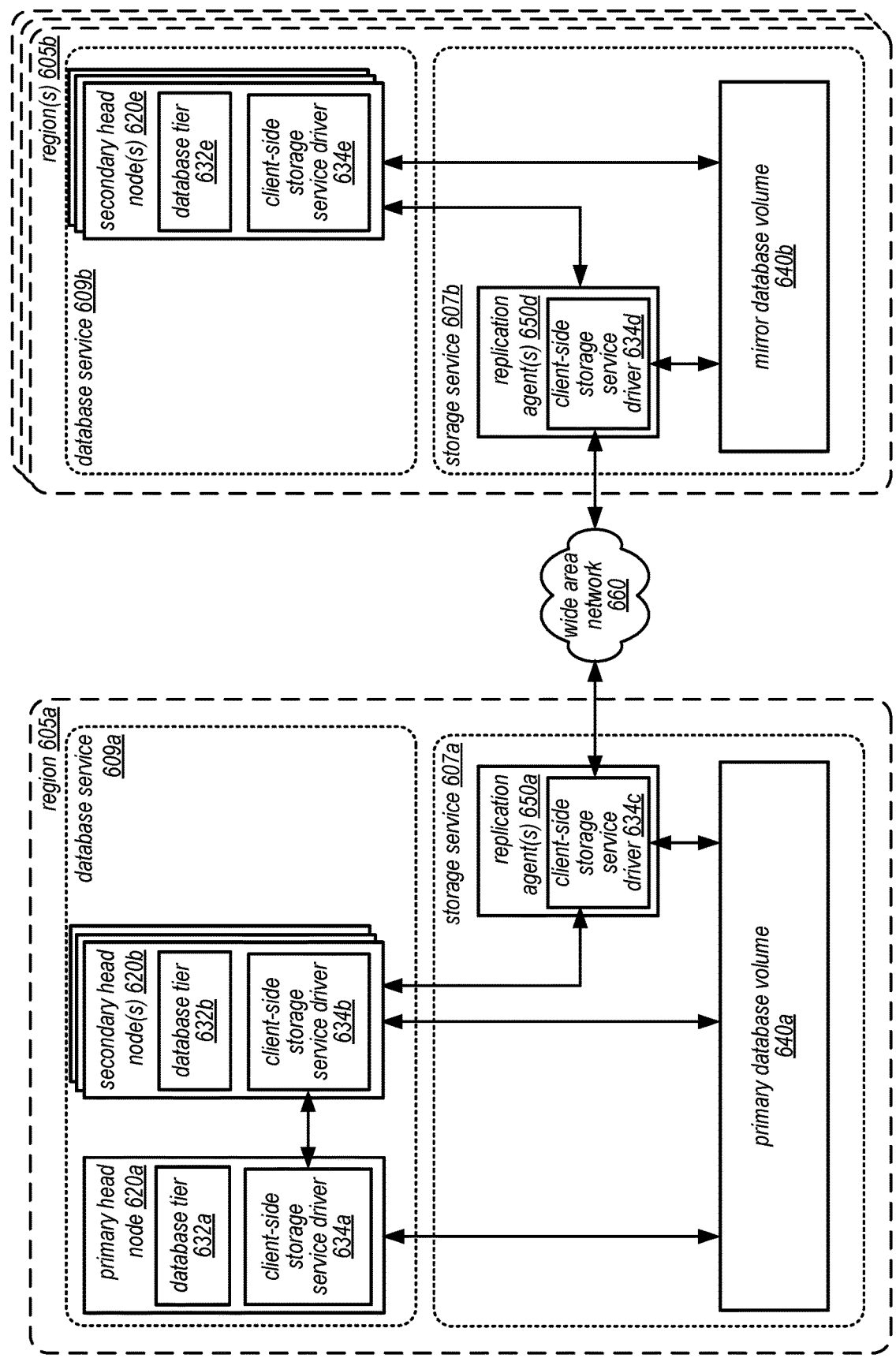
FIG. 6 is a block diagram illustrating various components of a database system including database copies that may implement adaptive replication, according to some embodiments.

FIG. 6 is a block diagram illustrating various components of a database system including database copies that may implement adaptive replication, according to some embodiments. Various ones of the components illustrated in FIG. 6 may be implemented via various computer systems (e.g., such as the computer system illustrated in FIG. 12, described below).

In this illustrated example, multiple clusters of one or more database engine head nodes may be hosted in respective services in database services 609a and 609b in region 605a and region(s) 605b to provides database services to clients that access the databases in the different regions. It should be noted that, while the illustrated example shows one remote cluster, any number of remote clusters may be employed. Similarly, one or multiple head nodes may be implemented within each database service for a database, in some embodiments Multiple head nodes, as discussed above with regard to FIGS. 2-5, such as primary head node 620*a* and secondary head node(s) 620*b* may be implemented as part of database service 609*a* to provide access to a database stored in storage service 607*a*, in primary database volume 640*a*. Primary head node 620 may provide read and write capabilities to the database, utilizing database tier 632*a* and client-side storage service driver 634*a*, as well as offering additional read capacity via secondary head node(s) 620*b*, which includes a respective database tier 632*b* and client-side storage service driver 634*b*.

Storage service 607*a* may also implement a replication agent(s) 650*a* which may act as a reverse proxy, among other features, to replicate changes made to the database at primary database volume 640*a* to a mirror database volume 640*b* stored in storage service 607*b* in region 605*b*. Note that other regions may also implement mirror database volumes in respective storage services. Replication agent(s) 650*a* may implement a client-side storage service driver 634*c* to perform the various techniques discussed below with regard to FIGS. 7-11. Similarly, storage service 607(*b*) may implement replication agent(s) 640*d*, which may include client-side storage service 634*d* to perform the below replication techniques while minimizing the time that mirror database volume is unable to be accessed by secondary head node 620*e* (via database tier 632*e* and client-side storage service driver 634*e*), in some embodiments. In some embodiments, multiple replication agents may be assigned to replicating changes to database copies (e.g., 2 replication agents for source database and database copy).

In some embodiments, client-side storage service drivers 634 may implement a one or more streams of information to assist in synchronizing updates between database volumes and head nodes. For example, client-side driver 634*a* may send change notifications of cache invalidation messages, and/or changes to system metadata, such as data structures that indicate the layout and/or definition of the database and/or in-flight transaction data, such as the states of and entries of active transactions at primary node 620*a*) to client-side driver 634*b* of replica node 620*b* as well as to client-side driver 634*c* of replication agent 650*a*. Replication agent(s) 650*a* can function as an additional replica node of the database in database service 609*a*, in some embodiments. Replication agent 650 may forward the change notifications received from the client-side driver 634*a* to the client-side driver 634*d* of the replication agent 650*d* over wide area network 660 (which may be a public network, in some embodiments) where the replication agent 650*d* may function as single writer for mirror database volume 640*b*. In this way, performance of the database in database service 609*a* is minimally degraded yet the access to mirror database volume 640*b* can provide a consistent read view of the database with minimal latency, in some embodiments.

As the communications between replication agents may occur over wide area network 660, various security protocols may be implemented. For example, SSL or other TLS security techniques may be implemented to safeguard or otherwise encrypt data being transmitted over wide area network 660 (e.g., log records or pages as discussed below).

Figure 7:
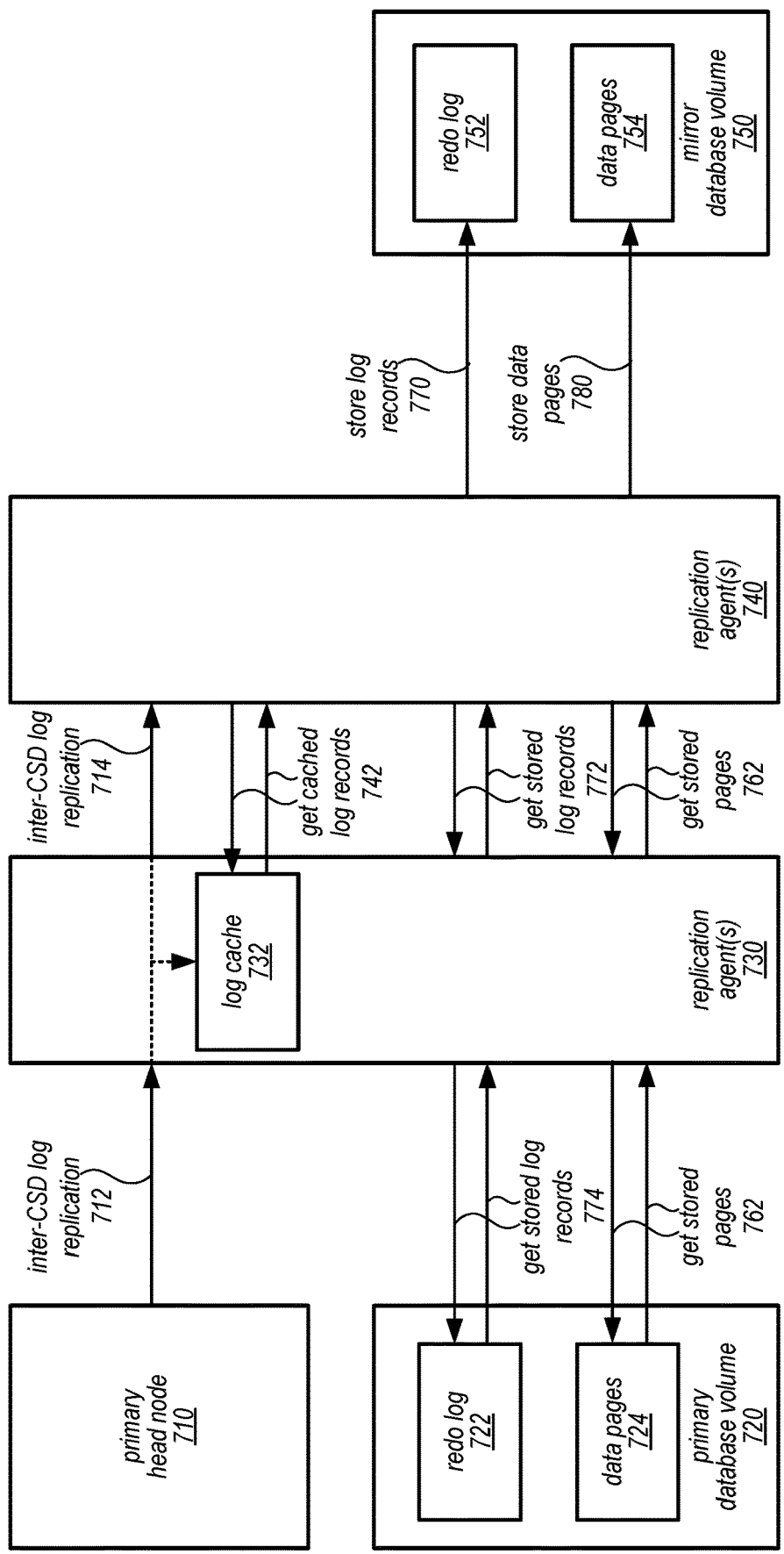
FIG. 7 is a logical block diagram illustrating various sources and interactions to obtain updates to a copy of a database, according to some embodiments.

FIG. 7 is a logical block diagram illustrating various sources and interactions to obtain updates to a copy of a database, according to some embodiments. As noted above, a primary head node, like primary head node 710 may generate redo log records to describe updates or other changes to a database, such as the database stored in primary database volume 720. Primary head node 710 may perform inter-CSD replication 712, in some embodiments, to communicate or send redo log records as they are generated to other CSDs, such as a CSD implemented as part of replication agent 730. In some embodiments, replication agent(s) 730 may push the inter-CSD log replication communications 714 to replication agent(s) 740 (which may handle processing of the stream of log records using a CSD implemented at replication agent(s) 740), in some embodiments, while in other embodiments, replication agent(s) 740 may poll for these communications (not illustrated).

In some embodiments, replication agent(s) 730 may implement a log cache 732 which may store log records from the log stream. In this way, if communication failures (e.g. dropped packets, network partitions) or other interruptions cause some log records to be missed in inter-CSD log replication 714, then log cache 732 may be able to supply the missing records without having to go to other locations. For example, replication agent(s) 740 may be able get cached log records 742 from log cache 732, in some embodiments. Although not illustrated, in some embodiments, replication agent(s) 740 may implement a cache of log records (e.g., for one or multiple secondary database engine head nodes to access in order to perform other operations).

Replication agent(s) 730 may also be able to access redo log 722 primary database volume 720 if the cache 732 would not have the missing redo log records. For example, replication agent(s) 740 may be performing a catch-up or re-mirror technique, as discussed below with regard to FIG. 9, in order to obtain missing updates that were not received as part of the inter-CSD log replication stream, in some embodiments. Instead, replication agent(s) 740 may submit a request to get stored log records 762 which replication agent(s) 730 may perform, as indicated at 764, in order to obtain the request log records from primary database volume 720.

Similarly, replication agent(s) 730 may also be able to request 762 data pages from data pages 724 stored as part of primary database volume 720. For example, replication agent(s) 740 may be performing a catch-up or re-mirror technique, as discussed below with regard to FIG. 9, in order to obtain missing updates that were not received as part of the inter-CSD log replication stream, not present in the log cache 732, or redo log 722, in some embodiments.

As discussed below with regard to FIGS. 8-11, replication agent(s) 740 (or 730) may store log records 770 to update a redo log 752 of a mirror database volume 750 or store data pages 780 to update the data pages 754 of mirror database volume 750 in different circumstances. For example, a threshold determination as to the number of changes (e.g., amount of data, number of operations or records, number of portions of the database to access, etc.) may determine whether replication agent 740 utilizes inter-CSD log replication 714, cached log records 742, stored log records 772, or data pages 762, in some embodiments. In some scenarios, various techniques for performing the updates, such as the techniques to minimize disruption of data page updates, as discussed below with regard to FIG. 10 may be performed by replication agent 740 (or 730). In some embodiments, replication agent(s) 740 may also implement a log cache (not illustrated) for performing updates (or providing updates to a secondary head node that accesses mirror database volume 750).

Figure 8:
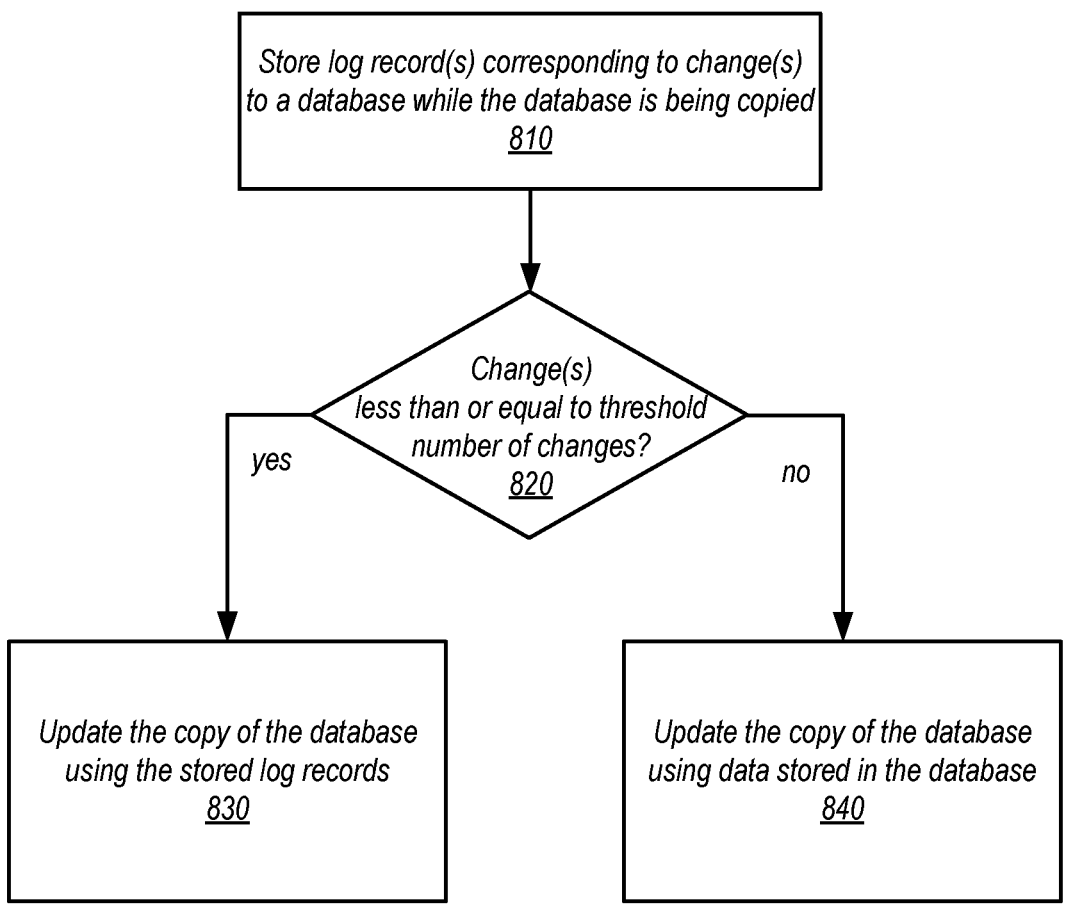
FIG. 8 is a high-level flowchart illustrating various methods and techniques to implement adaptive replication for database copies, according to some embodiments.

The database service and storage service discussed in FIGS. 2 through 7 provide examples of a system that may implement adaptive replication for database copies. However, various other types of data stores (e.g., non-log structured) or other storage engines may implement adaptive replication for database copies. FIG. 8 is a high-level flowchart illustrating various methods and techniques to implement adaptive replication for database copies, according to some embodiments. Various different systems and devices may implement the various methods and techniques described below, either singly or working together. For example, a replication agent, database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

Various kinds of access systems for databases (e.g., different types of query or database engines) may record changes to a database in a change log as part of performing updates to the database, in some embodiments. For example, the redo log generated by a database engine head node and stored in a storage volume in a separate storage service as discussed above with regard to FIGS. 2-7 may describe log records corresponding to changes to a database. As indicated at 810, log record(s) corresponding to changes to a database may be stored while the database is being copied, in some embodiments. For example, a mirror, replica, or other copy of a database may be created and update while the source database of the copy is also being updated, in some embodiments. As discussed above with regard to FIG. 1, in at least some embodiments, the copy of the database may be available to service access requests (e.g., database queries). The source database, and the copy of the database may be stored in different regions, data centers, or other geographically separate locations as discussed above with regard to FIGS. 2 and 6 where replicating changes between the database and the copy may occur over a wide area network that is not private to an entity that controls, owns, and/or operates the database and the copy of the database.

In addition to storing log record(s) corresponding to changes to a database, the changes to the database may be made to the underlying data for the database in storage, in some embodiments. Different techniques may be performed to update the underlying database data. For example, as discussed above with regard to FIGS. 1-7, the log records stored for a database may be applied in the background to update data in database pages (or in response to a read request) instead of updating the data pages when a write request is received. In some embodiments, log records may be generated as part of guaranteeing consistency, isolation, or other transactional properties, for example, and may be generated in addition to applying updates to underlying storage (e.g., data pages) for a database when a write request to the database is received. Eventually, changes to a database may be applied or otherwise included in the underlying portions of storage for a database (e.g., to a record or entry in the appropriate block, page, segment, partition, etc.), in some embodiments.

Replication of changes to the copy of the database may be performed according to technique that is dynamically or situationally determined, in some embodiments. For example, as illustrated in FIG. 8, an evaluation may be performed to determine whether the changes are less than or equal to some threshold number of changes, in some embodiments. Threshold evaluation for changes may be performed in different ways. In some embodiments, the number of changes to be performed may be represented by the number of log records corresponding to the changes and may be tracked as to how many log records have yet to be applied to the copy of the database. In some embodiments, numbers or other indicators of an ordering of changes to the database (e.g., LSNs for log records) may indicate whether change(s) are less than the threshold number of changes (e.g., difference between LSN values).

In some embodiments, the threshold number of changes may be indicated by a number of changes (e.g., <=50 changes). In some embodiments, the threshold number of changes may be indicated by an amount of change (e.g., the size or amount of data to be accessed in order to perform the updates, such as <=10 Megabytes). In some embodiments, the threshold number of changes may be implicitly determined by the location in which the changes may be obtained from. For example, as discussed below with regard to FIG. 9, log records may be received as part of a stream of log records from a primary database engine that generated them, a log cache (e.g., at a replication agent), log records from a log stored in persistent storage, or data pages that include changes (e.g., that have already been applied), in some embodiments. The location of pages in each location may implicitly indicate the amount of changes to be made (e.g., the number of log records may exceed the size of the log cache, or exceed some threshold to be applied to a data page, etc.).

As indicated at 830, in some embodiments, the copy of the database may be updated using stored records when the change(s) are less than or equal to a threshold number of changes. For example, log records may be used or obtained from a log cache, a log itself or as part of a stream of log records and then stored in a change log for the copy of the database (which may subsequently apply the log records to update the underlying database in response to read requests, write requests or as part of background operations), in some embodiments.

As indicated at 840, the copy of the database may be updated using data stored in the database, in some embodiments, when the change(s) are greater than the threshold number of changes. For example, as discussed above with regard to FIGS. 1, 6 and 7, pages (or other storage structures) may be identified that contain the change(s). Data pages that do not include the change(s) (e.g., which may store portions of the database not updated) may not be copied, in some embodiments. In this way, the update to the copy of the database can still be performed without copying portions of the database that were not actually updated. The data may then be written or otherwise stored to replace other data in the copy of the database, in some embodiments, or written to a location as part of the database from which it can be later applied, as discussed below with regard to FIG. 10, in some embodiments.

Figure 9:
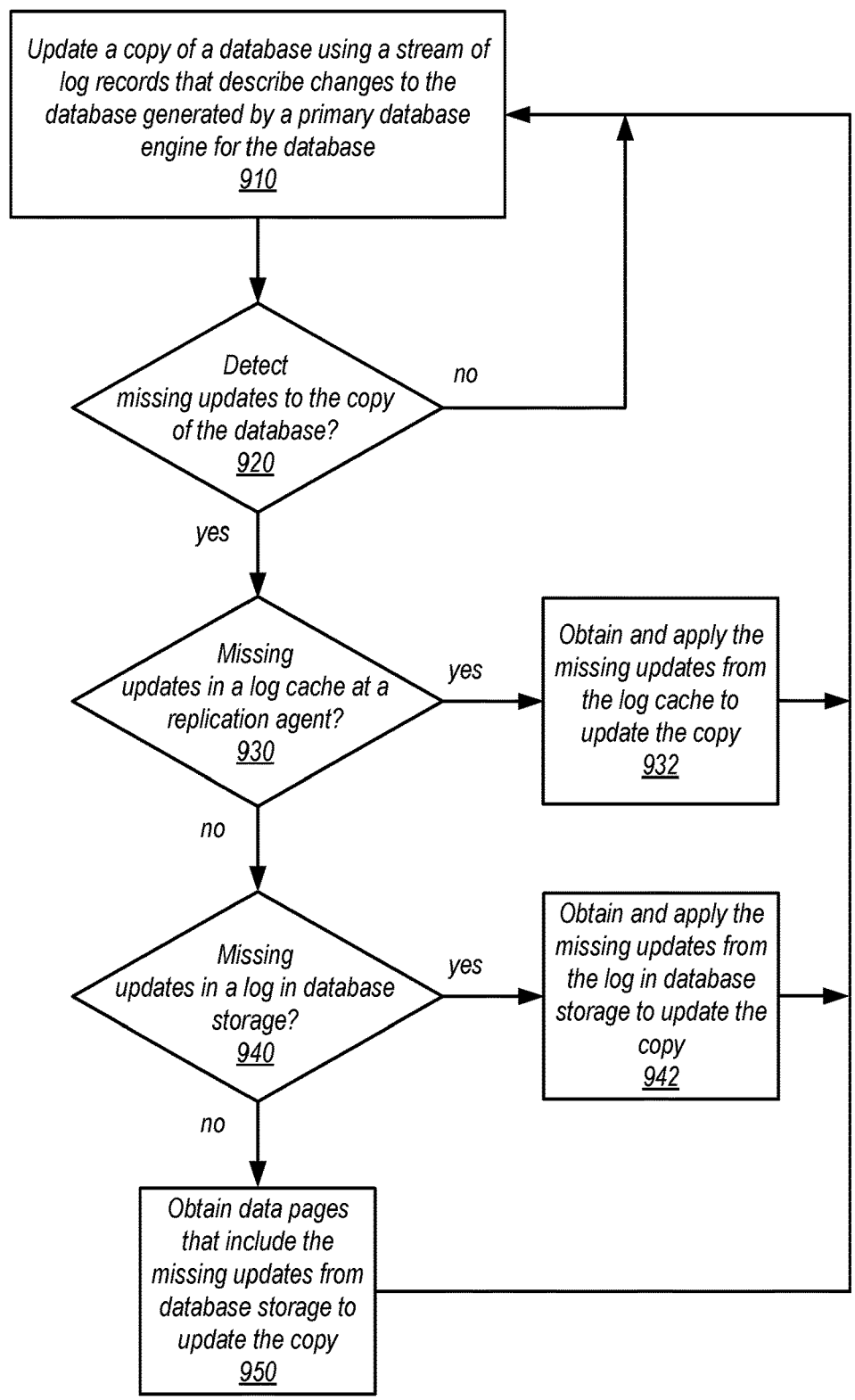
FIG. 9 is a high-level flowchart illustrating various methods and techniques to obtain missing updates to a database copy, according to some embodiments.

Replication techniques for updating a copy of a database may be dynamically selected and performed, in various embodiments. For example, in embodiments where log records are streamed from a source database to a copy, as discussed above with regard to FIG. 7, other replication techniques may be situationally applied in order to minimize disruption to clients accessing the copy of the database when changes described in the stream of log records are missed. For example, various components that perform replication could fail or be interrupted (e.g., replication agents or database engine head nodes), which could cause some updates to be missed. Similarly, network failures within a private network such as a provider network region or a public network, such as the Internet, could disrupt communications to cause a copy of the database to get behind or otherwise become out of synchronization with the database. FIG. 9 is a high-level flowchart illustrating various methods and techniques to obtain missing updates to a database copy, according to some embodiments.

As indicated at 910, a copy of the database may be updated using a stream of log records that describe changes to the database generated by a primary database engine for the database, in some embodiments. In some embodiments, this streaming update technique may be the default technique for a synchronized (or nearly synchronized) copy of a database. Failures or other interrupts however may cause the loss of updates from being applied using the stream of log records. These missing updates to the copy of the database may be detected, in some embodiments, as indicated at 920. For example, a connection status of components that send and/or receive the stream of log records may provide an indication as to whether or not updates have been missed. If the connection is broken, down, or otherwise not healthy, then updates may be detected as missed (even if the particular missing updates may not yet be identified), in some embodiments. In some embodiments, gaps or other holes in a logical ordering of updates (e.g., missing LSN values for log records) may indicate that one or more log records are missing, and thus one or more updates are missing. If no updates are missing then the stream of log records may continue to be used to update the copy of the database, as indicated by the negative exit from 920, in some embodiments.

Obtaining and applying the missing updates may be performed in different ways and have differing impacts upon the performance clients accessing the copy of the database. In some embodiments, a priority scheme or ordering may be applied to obtain and/or apply the missing updates in a less disruptive manner before using a more disruptive source and technique for the missing updates. For example, as indicated at 930, a check may first be performed to determine whether or not the missing updates may be described by log record(s) in a log cache maintained at a replication agent, in some embodiments. For example, as part of exchanging updates replication agents may exchange information to indicate the content of the replication agent's caches of log records. In some embodiments, a log cache may be scanned, searched or queries for the updates. If the missing updates are located in the log cache, then the missing updates may be obtained from the log cache and applied to update the copy of the database, as indicated at 932, in some embodiments.

In some embodiments, the log cache may not include the missing updates (e.g., due to age or size limitations for maintaining log records in the cache). In such scenarios, the updates may be obtained from a log in database storage (e.g., the redo logs discussed above with regard to FIGS. 4 and 7) if present in the log, as indicated at 940. For example, the log may be scanned, searched, queried, or otherwise evaluated to obtain the missing updates, in some embodiments. If the missing updates are present in the log, then they may be obtained and applied from the log in database storage to update the database copy, as indicated at 942, in some embodiments. For example, a request to copy, transfer, or otherwise read the log records from the log and write the log records to a change log or other log for the copy of the database may be performed, in some embodiments.

As indicated at 950, in some embodiments, data pages that include the missing updates may be obtained from database storage to update the copy. For example, the amount or other number of changes for the database may grow so large as to exceed a threshold for maintaining log records (e.g., either for an individual data page or for the database as a whole) so that the updates described in the log are applied to the respective data pages and removed from the log, in some embodiments. To identify the data pages that include the missing changes, the data pages may be evaluated to identify those data pages that are different as of a point in time associated with the missing updates, in some embodiments. For example, an LSN value may be recorded for each data page that indicates the LSN associated with the last change made to that data page. If changes are missing starting from LSN 10,123, then any data page with an associated LSN greater than or equal to 10,123 may be a data page that includes a missing update. In some embodiments, different data pages may be marked or stored in a different location so that they may be recognized for replication to a copy of the database.

Log stream replication may resume after the missing updates are found, as illustrated in FIG. 9. In some embodiments, multiple iterations of searching for, obtaining, and applying missing updates may be performed before log stream replication may be performed again. For example, while missing updates are found, obtained, and applied, further changes may be made to the source database that will be missing in the copy of the database, and thus the same techniques may be performed iteratively until the copy of the database is synchronized (or nearly synchronized) with the database, in some embodiments.

Figure 10:
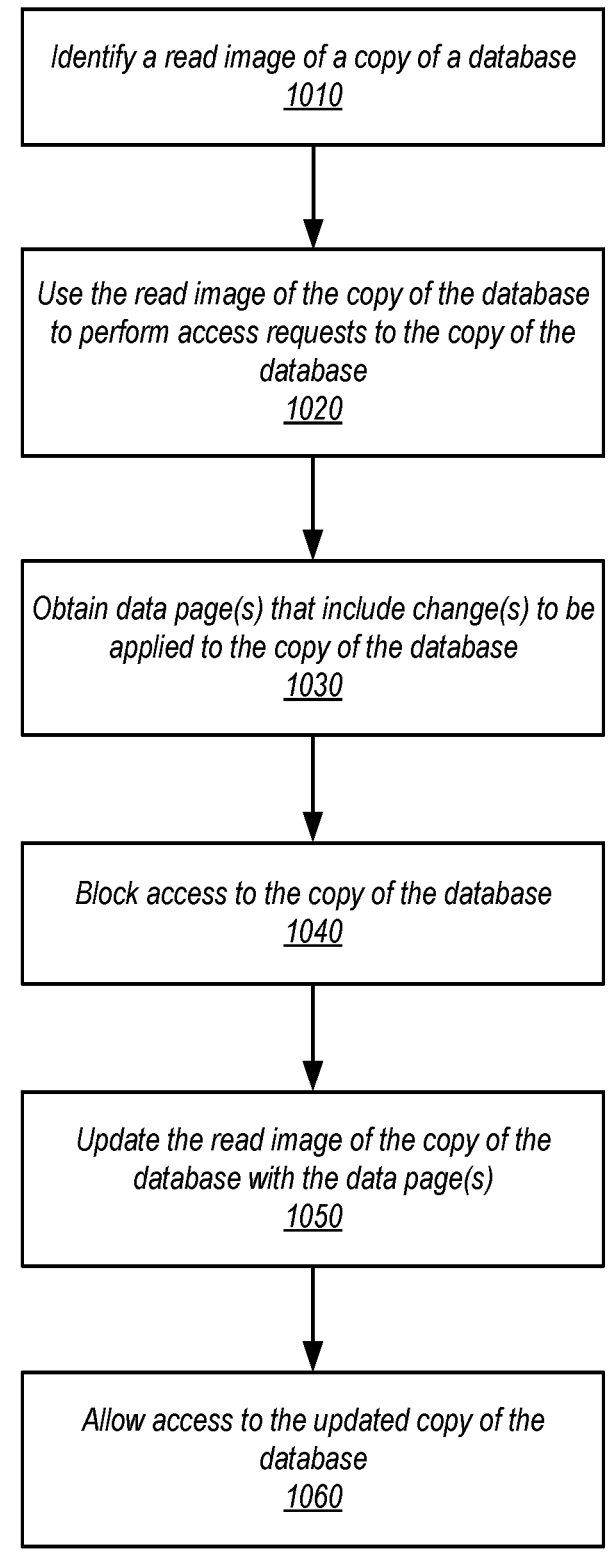
FIG. 10 is a high-level flowchart illustrating various methods and techniques to replicate data pages for adaptive replication for database copies, according to some embodiments.

Applying data pages (or other underlying portions of database data) to a copy of a database may be more disruptive to the availability of the copy for providing access to clients than log-based replication techniques, in some embodiments. Some techniques may be performed to limit the disruption caused by data page replication techniques. FIG. 10 is a high-level flowchart illustrating various methods and techniques to replicate data pages for geographical mirrors for databases, according to some embodiments, which may limit or minimize the disruption to client access to the copy of the database.

As indicated at 1010, when a data page update is to be performed (e.g., in scenarios identified in FIGS. 8 and 9), a read image of a copy of a database may be identified, in some embodiments. For example, the read image may be a state or set of data pages that store the copy of the database which may be locked, blocked, or otherwise treated as read-only, in some embodiments. In this way, the copy of the database may still provide a consistent view of the database from which read requests (e.g., queries) may be performed without a concern that an update would be made to a page while a read was being processed. As indicated at 1020, the read image may be used to perform access requests to the copy of the database, in various embodiments. If, for instance, a change log were also checked when processing a read request to see if any additional changes had been received that are applicable to a data page of the copy, the records in the change log may be ignored (or not evaluated), in some embodiments.

As indicated at 1030, data page(s) that include the change(s) to be applied to the copy of the database may be obtained, in some embodiments. For example, as discussed above with regard to element 950 in FIG. 9, the data pages that include the missing changes, the data pages may be evaluated to identify those data pages that are different as of a point in time associated with the missing updates, in some embodiments, or different data pages may be marked or stored in a different location so that they may be recognized for replication to a copy of the database, in some embodiments. The obtained pages may be stored in a temporary or staging area in some embodiments so as not to be accessed, overwrite, or disrupt the read image of the copy of the database, in some embodiments.

Once the data pages to be applied have been obtained, access to the database may be blocked, as indicated at 1040, in some embodiments. For example, incoming access requests (e.g., queries) may be rejected or buffered, in some embodiments. In some embodiments, established connections between clients and a database engine for the copy of the database may be closed, cancelled, or otherwise dis-established. In some embodiments, the database engine may be suspended, shut-down, or restarted. In some embodiments, a connection between the database engine and storage (e.g., managed by the client-side storage service driver discussed above with regard to FIGS. 3-6) may be closed (e.g., by sending a close, disconnect, or unmount request for a database volume).

As indicated at 1050, the read image of the copy of the database may be updated with the obtained data page(s), in some embodiments. For example, the obtained pages may be used to replace or overwrite the corresponding pages of the copy to which updates are to be applied. In some embodiments, a difference between obtained pages and their corresponding versions in the read image may be determined and applied. In some embodiments, metadata or state information for the copy of the database may be updated to correctly map the new or modified pages, in some embodiments. Tracking information or other descriptive information for the database pages may be changed to reflect the updated pages. In some embodiments, the database engine may be restarted and reconnect, remount, or re-establish access with the copy of the database in storage and utilize the updated metadata in order to be able to correctly access the copy of the database to perform access requests.

As indicated at 1060, access to the updated copy of the database may be allowed after the update to the copy is performed, in some embodiments. For example, connections between a database engine and clients may be resumed, re-established, renewed or allowed, in some embodiments. Buffered or blocked requests may be performed using the updated copy, in some embodiments, as well as performing new requests.

Figure 11:
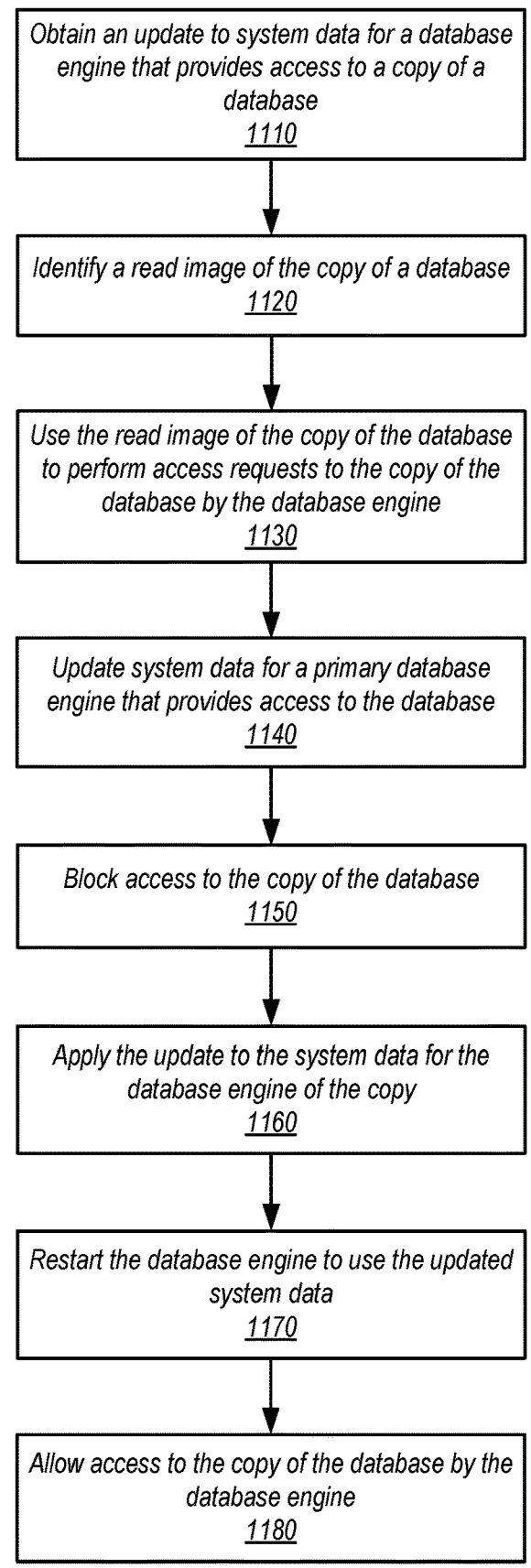
FIG. 11 is a high-level flowchart illustrating various methods and techniques update system data for database engine that provides access to a copy of a database, according to some embodiments.

Changes to system data or information used by a database engine to provide access to a database or copy thereof may be instigated by users of a database (or by system administrators that are updating software or functionalities associated with database engines). For example, database schema information described in a data dictionary or other set of metadata that indicates a number of columns in a table, type of data for each column, statistics for the table, and so on may be updated in response to data definition language (DDL) requests submitted by a user of a database. Like changes to be replicated between databases, these system data changes may also be replicated in order to allow copies of a database to mirror the database. FIG. 11 is a high-level flowchart illustrating various methods and techniques update system data for database engine that provides access to a copy of a database, according to some embodiments.

As indicated at 1110, an update to system metadata for a database engine that provides access to a copy of a database may be obtained, in some embodiments. For example, scripts, executables, statements, files, data objects or other information may be copied or sent to a staging area or storage location accessible to the database engine in order to be applied for the database engine's use.

Similar to the page update techniques discussed above, a read image of the copy of the database may be identified, as indicated at 1120, in some embodiments. For example, the read image may be a state or set of data pages that store the copy of the database which may be locked, blocked, or otherwise treated as read-only, in some embodiments. In this way, the copy of the database may still provide a consistent view of the database from which read requests (e.g., queries) may be performed without a concern that an update would be made to a page while a read was being processed. Also as discussed above, the read image of the copy of the database may be used to perform access requests to the copy of the database by the database engine, in some embodiments. For example, if a change log were also checked when processing a read request to see if any additional changes had been received that are applicable to a data page of the copy, the records in the change log may be ignored (or not evaluated), in some embodiments.

As indicated at 1140, system data for a primary database engine that provides access to the database may be updated, in some embodiments. For example, the various scripts, executables, objects, files, or other instructions obtained above at 1110 may also be obtained for and used to update the system data for the primary database engine, in some embodiments. The primary database engine may be updated first so that it can continue to process new access requests (including new updates to the database) using the updated system data, in some embodiments. Then, when the database engine for the copy is updated, the updates may be formatted or processed according to the updated system data (and thus may be compatible with the copy as well), in some embodiments.

As indicated at 1150, access to the database may be blocked, in some embodiments. As discussed above with regard to FIG. 10, incoming access requests (e.g., queries) may be rejected or buffered, in some embodiments. In some embodiments, established connections between clients and a database engine for the copy of the database may be closed, cancelled, or otherwise dis-established. In some embodiments, the database engine may be suspended, shut-down, or restarted. In some embodiments, a connection between the database engine and storage (e.g., managed by the client-side storage service driver discussed above with regard to FIGS. 3-6) may be closed (e.g., by sending a close, disconnect, or unmount request for a database volume).

As indicated at 1160, the update to the system data for the database engine of the copy of the database may applied, in some embodiments. For example, the various scripts, executables, objects, files, or other instructions obtained above at 1110 may be used to update the system data for the primary database engine, in some embodiments. In some embodiments, system updates may occur at the same time or overlapping with data page updates, as discussed in FIG. 10 so that the accessing blocking can be performed once for both types of updates. As indicated at 1170, the database engine may be restarted to use the updated system data for providing access to the database, in some embodiments. For example, the process performing the database engine may be killed or otherwise stopped so that a new process to perform the database engine may be started in its place. As indicated at 1180, access to the copy of the database may be allowed after the restart is performed, in some embodiments. For example, connections between a database engine and clients may be resumed, re-established, renewed or allowed, in some embodiments. Buffered or blocked requests may be performed using the updated copy, in some embodiments, as well as performing new requests.

Figure 12:
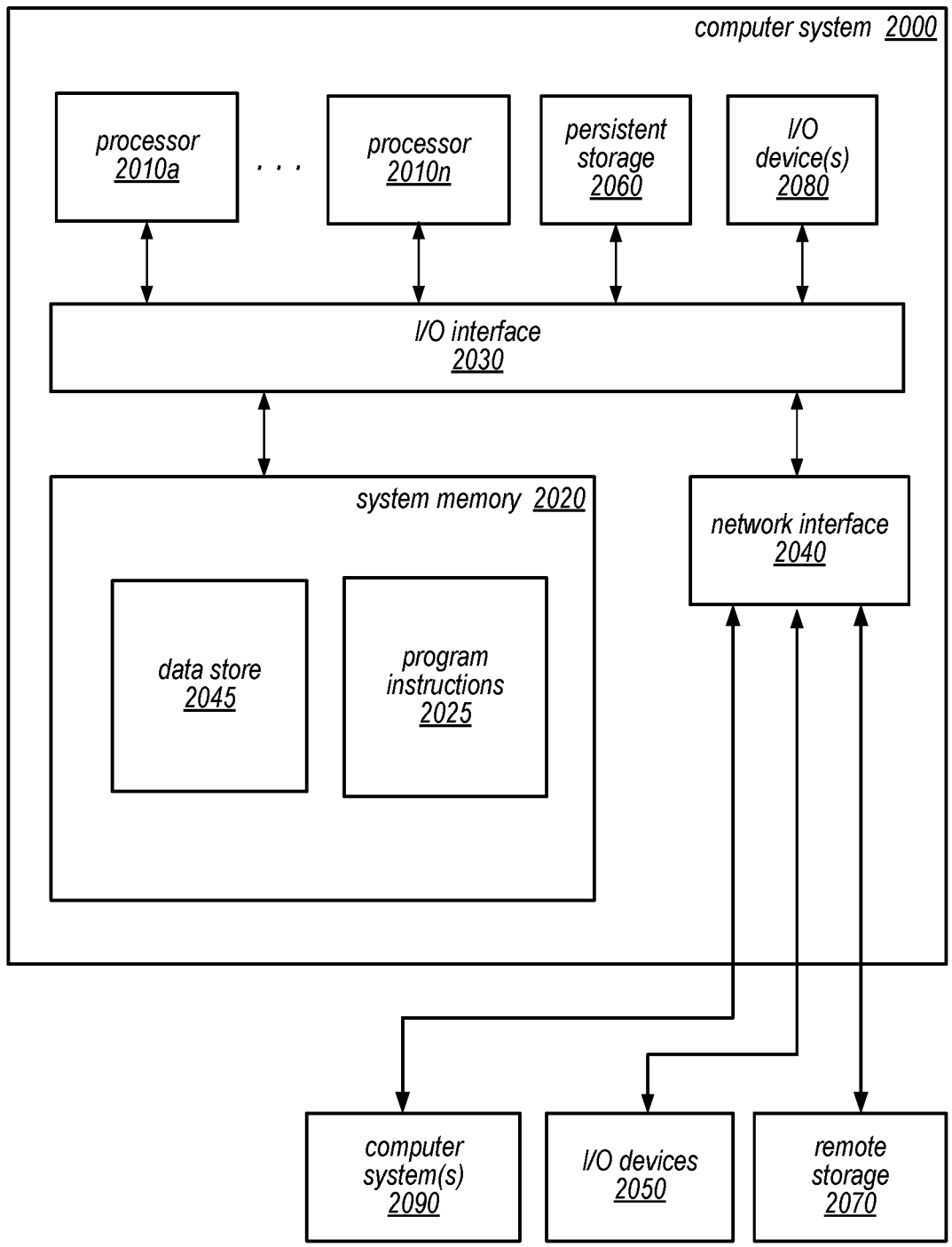
FIG. 12 is a block diagram illustrating an example computer system, according to various embodiments.

FIG. 12 is a block diagram illustrating an example computer system, according to various embodiments. For example, computer system 2000 may implement a read-write (or master/leader/primary) node of a database tier, a read-only node (or read replica/secondary node), replication agents, or one of a plurality of storage nodes of a separate distributed storage system that stores database tables and associated metadata on behalf of clients of the database tier, in various embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
        perform, by a primary database engine for a database, one or more changes to a database;
        store, by the primary database engine, one or more log records corresponding to the one or more changes while the database is being copied, wherein the copy of the database is available to process access requests received at a secondary database engine that are directed to the copy of the database;
        update the copy of the database with the one or more changes using the stored log records if the one or more changes are equal to or less than a threshold number of changes; and
        update the copy of the database with the one or more changes using data stored in the database if the one or more changes exceeds the threshold number of changes.

2. The system of claim 1, wherein the program instructions cause the at least one processor to further perform the method to at least:
    before the storing of the one or more log records, send a stream of log records corresponding to other changes performed at the database to the copy of the database to update the copy of the database with the other changes.

3. The system of claim 1, wherein the program instructions cause the at least one processor to further perform the method to at least:

detect one or more updates, corresponding to one or more other changes to the database, as missing in the copy of the database; and responsive to the detection, perform the missing one or more updates of the copy of the database with the one or more other changes using the stored log records if the one or more other changes are equal to or less than a threshold number of changes or perform the missing one or more updates of the copy of the database with the one or more other changes using data stored in the database if the one or more other changes exceeds the threshold number of changes.

4. The system of claim 1, wherein the primary database engine is implemented as part of a first database service in a first provider network region, wherein the secondary database engine is implemented as part of a second database service in a second provider network region, wherein the database is stored in a first storage service in the first provider network region and wherein the copy of the database is stored in a second storage service in the second provider network region;

wherein to update the copy of the database with the one or more changes using the stored log records, the program instructions cause the at least one processor to perform the method to at least send the stored log records to a replication agent hosted as part of the second storage service via a wide area network connection; and wherein to update the copy of the database with the one or more changes using data stored in the database, the program instructions cause the at least one processor to perform the method to at least send the data to the replication agent hosted as part of the second storage service via the wide area network connection.

5. A method, comprising:

performing, by one or more computers:

storing one or more log records corresponding to one or more changes to a database while the database is being copied;

updating the copy of the database with the one or more changes using the stored log records if the one or more changes are equal to or less than a threshold number of changes;

updating the copy of the database with the one or more changes using data stored in the database if the one or more changes exceeds the threshold number of changes.

6. The method of claim 5, further comprising:

detecting one or more missing updates to the copy of the database corresponding to one or more other changes to the database; and responsive to the detecting, performing updating the copy of the database with the one or more other changes using the stored log records if the one or more other changes are equal to or less than a threshold number of changes or performing updating the copy of the database with the one or more other changes using data stored in the database if the one or more other changes exceeds the threshold number of changes.

7. The method of claim 5, wherein updating the copy of the database with the one or more changes using the data stored in the database comprises:

identifying a read image of the copy of the database;

using the read image of the copy of the database to perform access requests to the copy of the database;

obtaining the data stored in the database;

blocking access to the copy of the database;

updating the read image of the copy of the database with the data; and allowing access to the updated copy of the database.

8. The method of claim 5, wherein updating the copy of the database with the one or more changes using the stored log records comprises obtaining the stored log records from a cache of log records at a replication agent or from a separate distributed storage system that stores the database.

9. The method of claim 5, further comprising:

obtaining an update to system data for a secondary database engine that provides access to the copy of the database;

after performing the update to system data for a primary database engine that provides access to the database:

blocking access to the copy of the database;

updating the system data for the secondary database engine;

restarting the secondary database engine; and allowing access to the updated copy of the database.

10. The method of claim 5, further comprising:

before storing the one or more log records, sending a stream of log records corresponding to other updates performed at the database to a replication agent for the copy of the database to update the copy of the database with the other updates.

11. The method of claim 5, further comprising:

updating a second copy of the database with the one or more changes using the stored log records if the one or more changes are equal to or less than a threshold number of changes;

updating the second copy of the database with the one or more changes using data stored in the database if the one or more changes exceeds the threshold number of changes.

12. The method of claim 5, wherein updating the copy of the database with the one or more changes using the stored log records comprises sending the stored log records to a replication agent via a wide area network connection; and wherein updating the copy of the database with the one or more changes using data stored in the database comprises sending the data to the replication agent via the wide area network connection.

13. The method of claim 12, wherein sending the stored log records to a replication agent via a wide area network connection comprises applying a security protocol to encrypt the stored log records over the wide area connection; and wherein sending the data to the replication agent via the wide area network connection comprises applying a security protocol to encrypt the data over the wide area connection.

14. A non-transitory, computer-readable storage medium, storing program instructions that when executed by one or more computing devices cause the one or more computing devices to implement:

storing one or more log records corresponding to one or more changes to a database while the database is being copied, wherein the copy of the database is available to process access requests directed to the copy of the database;
   updating the copy of the database with the one or more changes using the stored log records if the one or more changes are equal to or less than a threshold number of changes;
   updating the copy of the database with the one or more changes using data stored in the database if the one or more changes exceeds the threshold number of changes.

15. The non-transitory, computer-readable storage medium of claim 14, wherein the program instructions further cause the one or more computing devices to implement:
   detecting one or more missing updates to the copy of the database corresponding to one or more other changes to the database; and
   responsive to the detecting, performing updating the copy of the database with the one or more other changes using the stored log records if the one or more other changes are equal to or less than a threshold number of changes or updating the copy of the database with the one or more other changes using data stored in the database if the one or more other changes exceeds the threshold number of changes.

16. The non-transitory, computer-readable storage medium of claim 14, wherein the program instructions cause the one or more computing devices to implement:
   obtaining an update to system data for a secondary database engine that provides access to the copy of the database;
   after performing the update to system data for a primary database engine that provides access to the database:
      blocking access to the copy of the database;
      updating the system data for the secondary database engine;
      restarting the secondary database engine; and
      allowing access to the updated copy of the database.

17. The non-transitory, computer-readable storage medium of claim 14, wherein, in updating the copy of the database with the one or more changes using data stored in the database, the program instructions cause the one or more computing devices to implement:
   obtaining the data stored in the database;
   blocking access to the copy of the database;
   updating the copy of the database with the data; and
   allowing access to the updated copy of the database.

18. The non-transitory, computer-readable storage medium of claim 14,
   wherein, in updating the copy of the database with the one or more changes using the stored log records, the program instructions cause the one or more computing devices to implement sending, from a first replication agent implemented as part of a first storage system for the database, the stored log records to a second replication agent implemented as part of a second storage system for the copy of the database; and
   wherein, in updating the copy of the database with the one or more changes using data stored in the database, the program instructions cause the one or more computing devices to implement sending, from the first replication agent implemented as part of the first storage system for the database, the data to the second replication agent implemented as part of the second storage system for the copy of the database.

19. The non-transitory, computer-readable storage medium of claim 18, wherein a primary database engine that provides access to the database is implemented as part of a first database service in a first provider network region, wherein the copy of the database is accessed by a secondary database engine that is implemented as part of a second database service in a second provider network region, wherein the first storage system is a first storage service in the first provider network region and wherein the second storage system is a second storage service in the second provider network region.

20. The non-transitory, computer-readable storage medium of claim 19, wherein the first replication agent and the second replication agent send other log records or other data for replicating another database hosted in the first provider network region and the second provider network region that is hosted on behalf of a different user account.

* * * * *